(12) United States Patent
Sedita et al.

(10) Patent No.: US 10,927,483 B2
(45) Date of Patent: *Feb. 23, 2021

(54) FABRIC SUBSTRATES

(71) Applicant: Eastman Kodak Company, Rochester, NY (US)

(72) Inventors: Joseph Salvatore Sedita, Albion, NY (US); Mridula Nair, Penfield, NY (US); Mary Christine Brick, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/203,722

(22) Filed: Nov. 29, 2018

(65) Prior Publication Data
US 2020/0173067 A1    Jun. 4, 2020

(51) Int. Cl.

| | |
|---|---|
| *D03D 15/00* | (2006.01) |
| *C09D 127/06* | (2006.01) |
| *C09D 133/04* | (2006.01) |
| *C09D 7/65* | (2018.01) |
| *C09D 7/40* | (2018.01) |
| *C09D 5/18* | (2006.01) |
| *D06M 13/224* | (2006.01) |
| *D06M 11/51* | (2006.01) |
| *D06M 15/248* | (2006.01) |
| *D06M 15/263* | (2006.01) |
| *C09D 7/61* | (2018.01) |

(52) U.S. Cl.
CPC ........... *D03D 15/0027* (2013.01); *C09D 5/18* (2013.01); *C09D 7/61* (2018.01); *C09D 7/65* (2018.01); *C09D 7/69* (2018.01); *C09D 127/06* (2013.01); *C09D 133/04* (2013.01); *D06M 11/51* (2013.01); *D06M 13/224* (2013.01); *D06M 15/248* (2013.01); *D06M 15/263* (2013.01); *D06M 2200/30* (2013.01)

(58) Field of Classification Search
CPC ...................................................... D03D 15/00
See application file for complete search history.

(56) References Cited

U.S. PATENT DOCUMENTS

| | | | |
|---|---|---|---|
| 4,127,698 A | 11/1978 | Shimizu et al. | |
| 6,032,454 A | 3/2000 | Damour et al. | |
| 6,071,612 A | 6/2000 | Roderiguez et al. | |
| 9,920,478 B2 | 3/2018 | Damour, Jr. | |
| 2003/0054150 A1* | 3/2003 | Evans | B29C 70/50 428/297.4 |
| 2013/0052900 A1 | 2/2013 | Jung et al. | |
| 2018/0223474 A1 | 8/2018 | Nair et al. | |
| 2020/0173099 A1* | 6/2020 | Nair | C09D 133/04 |

FOREIGN PATENT DOCUMENTS

| | | |
|---|---|---|
| EP | 0385025 A2 | 9/1990 |
| EP | 0900294 B1 | 3/1999 |
| WO | 99/65661 | 6/1998 |

* cited by examiner

*Primary Examiner* — Andrew T Piziali
(74) *Attorney, Agent, or Firm* — J. Lanny Tucker

(57) ABSTRACT

A fabric substrate is prepared from woven coated yarns. Each coated yarn has a yarn core and a coating disposed coaxially on the yarn core. This coating contains: (i) porous particles in an amount of 4-20 weight %, each porous particle comprising a continuous polymeric phase and discrete pores dispersed within the continuous polymeric phase, a mode particle size of 2-50 μm; (ii) a film-forming binder material having a $T_g$ of less than or equal to 25° C., in an amount of 40-90 weight %; and (iii) an inorganic filler material having a value of less than 5 on the MOHS scale of mineral hardness, which inorganic filler material is present in an amount of 4-30 weight %.

20 Claims, No Drawings

FABRIC SUBSTRATES

RELATED APPLICATIONS

Reference is made to the following copending and commonly assigned patent applications:

U.S. Publication No. 2020/0172744 by Brick, Nair, and Sedita, and entitled "Composition for Making Coated Yarn";

U.S. Publication No. 2020/0173099 by Nair, Brick, and Sedita, and entitled "Yarn with Coating over Yarn Core"; and U.S. Pat. No. 10,704,192 by Nair, Brick, and Sedita, the disclosure of which is incorporated herein by reference.

FIELD OF THE INVENTION

This invention relates to fabric substrates prepared using unique coated yarns, which fabric substrates are useful as textiles for controlling light and heat transmission, for applications such as window shades. Each coated yarn consists of a yarn core that is clad with a coating having porous particles, a film-forming binder material, and an inorganic filler material. This coating provides a bright white and opaque appearance as well as heat and light control properties and color where required for the fabric substrates.

BACKGROUND OF THE INVENTION

In general, when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. Both mirrors and carbon black are opaque. Opacity depends on the frequency of the light being considered. The visual appearance of an individual fiber is also similarly determined by its optical properties namely its interactions with light.

High efficiency window treatments (shades or screens) are designed for heat and glare control for a chosen color. Materials having such properties are marketed by MERMET as E-Screen materials having KOOLBLACK™ Technology.

Such materials can be designed using yarns having a multifilament core that can be clad or coated with flame a retardant polymeric plastisol or other chemicals, for example as described in EP Patent 0 900 294B1 (Damour et al.) and U.S. Pat. No. 9,920,458 (MERMET). For example, the multifilament core can be composed on multiple strands of fiberglass and clad with a poly(vinyl chloride) plastisol can also contain inorganic flame retardants such as zinc borate, or oxides or aluminum, magnesium, zinc, tin, and lead.

One use for such fabrics is as window shades especially for commercial sites. Synthetic woven fabric consisting of bonded PVC-coated polyester and fiberglass yarns are also described in U.S. Pat. No. 4,587,997 (Brooks) and U.S. Pat. No. 6,032,454 (Damour et al.). Fiberglass core yarns with plastic coatings can provide durability and dimensional stability.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein the multiple emulsion process provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsion that provides the template for generating discrete pores within the resulting porous particles.

Despite the advances provided in the technical field of yarns and textiles produced therefrom, there is a need for improving their visual appearance by providing greater opacity and light scattering at the yarn level and for reducing glare of the final woven fabric made from such yarns. There is also a need to provide more environmentally friendly formulations for sheathing/cladding yarns.

SUMMARY OF THE INVENTION

The present invention provides a fabric substrate comprising a plurality of coated yarns, all woven together, wherein each coated yarn comprises a yarn core; and a coating disposed coaxially on the yarn core, which coating comprises:

(i) porous particles present in an amount of at least 4 weight % and up to and including 20 weight %, each porous particle comprising a continuous polymeric phase and discrete pores dispersed within the continuous polymeric phase, the porous particles having a mode particle size of at least 2 µm and up to and including 50 µm;

(ii) a film-forming binder material having a $T_g$ of less than or equal to 25° C., which film-forming binder material is present in an amount of at least 40 weight % and up to and including 90 weight %; and (iii) an inorganic filler material having a value of less than 5 on the MOHS scale of mineral hardness, the inorganic filler material being present in an amount of at least 4 weight % and up to and including 30 weight %, wherein the amounts of the (i) porous particles, the (ii) film-forming binder material, and the (iii) inorganic filler material are based on the total weight of the coating.

Certain embodiments of the present invention include a fabric substrate comprising a plurality of continuous coated yarns, all woven together, wherein each continuous coated yarn comprises a multifilament polyester or glass core; and an aqueous-based coating disposed coaxially on the multifilament polyester or glass core, which aqueous-based coating comprises:

(i) porous particles present in an amount of at least 4 weight % and up to and including 20 weight %, each porous particle comprising a continuous polymeric phase and discrete pores dispersed within the continuous polymeric phase, the porous particles having a mode particle size of at least 3 µm and up to and including 30 µm;

(ii) a film-forming binder material having a $T_g$ of less than or equal to 0° C., which film-forming binder material is present in an amount of at least 40 weight % and up to and including 90 weight %; and (iii) a non-abrasive, whitening inorganic filler material having a value of less than 5 on the MOHS scale of mineral hardness, which non-abrasive, whitening inorganic filler material comprises zinc sulfide and is present in an amount of at least 4 weight % and up to and including 30 weight %, wherein the amounts of the (i) porous particles, the (ii) film-forming binder material, the (iii) non-abrasive, and whitening inorganic filler material are based on the total weight of the aqueous-based coating, the fabric substrate has a L* of at least 70 and a Y tristimulus value of at least 65, and the (i) porous particles are present in the coating at a coverage of at least 4 g/m².

The present invention solves problems noted above with the use of (i) porous particles that can scatter visible light, in the cladding (coating) composition for the core of the yarn thereby increasing the opacity of the coating and controlling glare from final coated yarn and woven textile product. This feature is enhanced by the (i) porous particles and the presence of an (iii) inorganic filler material as described below. Additionally, this invention provides an aqueous composition that can be used as the cladding or coating to prepare coated yarns, using a water-based binder material that provides improved environmental safety and other features over the solvent-based conventional plastisol coatings currently used in the industry.

DETAILED DESCRIPTION OF THE INVENTION

The following discussion is directed to various embodiments of the present invention and while some embodiments can be desirable for specific uses, the disclosed embodiments should not be interpreted or otherwise considered be limit the scope of the present invention, as claimed below. In addition, one skilled in the art will understand that the following disclosure has broader application than is explicitly described for any specific embodiment.

Definitions

As used herein to define various components of the aqueous composition, coated yarns, fabric substrate, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

The terms "porous particle" and "(i) porous particles" are used herein, unless otherwise indicated, to refer to porous organic polymeric materials useful in the yarns, fabrics (substrates), compositions, and coatings according to the present invention. The porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The continuous polymeric phase of the (i) porous particles generally has the same composition throughout that solid phase. That is, the continuous polymeric phase is generally uniform in composition including any components that can be incorporated therein. In addition, if mixtures of polymers are used in the continuous polymeric phase, generally those mixtures also are uniformly distributed throughout.

As used in this disclosure, the term "isolated from each other" refers to the different (distinct) pores of same or different sizes that are separated from each other by some portion of the continuous polymeric phase and such pores are not interconnected. Thus, "discrete" pores refer to "individual" or "closed" non-connected pores or voids distributed within the continuous polymeric phase.

The terms "first discrete pore" and "second discrete pore" refer to distinct sets of isolated pores in the (i) porous particles. These first and second discrete pores can refer to distinct individual pores, or in most embodiments, they refer to distinct sets of pores. Each distinct set of pores includes a plurality of pores, each of which pores is isolated from others pores in the set of pores, and the pores of each set of pores are isolated from all other pores of the other sets of pores in the (i) porous particle. Each set of pores can have the same mode average size or both sets can have the same mode average size. The word "discrete" is also used to define different droplets of the first and second aqueous phases when they are suspended in the oil (solvent) phase (described below).

The (i) porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the (i) porous particles can include closed discrete pores of all sizes and shapes (that is, closed discrete pores entirely within the continuous polymeric phase) providing a suitable volume in each discrete pore, macro discrete pores are particularly useful. While there can be open macro pores on the surface of the (i) porous particle, such open pores are not desirable and can be present only by accident. The size of the (i) porous particles, their formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. However, if desired, the discrete pores can be grouped predominantly in one part (for example, "core" or "shell") of the (i) porous particles.

"Opacity" is a measured parameter according to the present invention, that characterizes the "hiding power" of an element or the extent to which the transmission of electromagnetic radiation such as visible light, is blocked. In the present invention, the "opacity" of a coating can be quantified by first measuring the luminous reflectance (CIE Y tristimulus value) of the coating when coated over both a white and a black substrate and then calculating the ratio of these reflectance values. The higher the value of this ratio, the greater the opacity.

CIELAB L*, a*, and b* values described herein have the known definitions according to CIE 1976 color space or later known versions of color space and can be calculated assuming a standard D65 illuminant and known procedures. These values can be used to express a color as three numerical color values: L* for the lightness (or brightness) of the color, a* for the green-red component of the color, and b* for the blue-yellow component of the color values.

Glass transition temperatures of the organic polymers used to prepare the continuous polymeric phase, or (ii) film-forming binder materials described below, can be measured using Differential Scanning calorimetry (DSC) using known procedures. For many commercially available organic polymers, the glass transition temperatures are known from suppliers.

"Openness" (Openness Factor, or OF) refers to how tight the weave is in a fabric material, the percentage of holes in a fabric construction, and is sometimes referred to as "weave density." The lower the OF, the less the light transmittance and the greater the visible light that is obstructed or blocked. OF is the ratio between transparent and opaque surfaces and depends on the spacing and dimension of the yarn.

As used herein, a "yarn" is a continuous length of interlocked fiber strands. Yarns are classified according to their structure into three basic categories: staple fiber yarns are made of several short staple fibers that are wound together; ply yarns are made of one or more strands of staple fiber yarns; a single ply yarn is a single strand of staple fibers held together by twisting. Multi-ply yarns are made of multiple single yarns twisted together. Filament yarn is made of one or more continuous strands that run the entire length of the yarn and are longer than staple fibers. Multiple filaments can be woven together or intertwined in a suitable manner or arranged together as a bundle with or without intertwining.

As used herein. a "coated yarn" according to the present invention is a yarn that acts as a "yarn core" on which a coating is disposed as described in detail below.

As used herein, the terms "fabric," "textile," and "fabric substrate" are meant to refer to materials that are composed of or prepared from the coated yarn according to the present invention, of any desirable diameter or length.

Uses

The coated yarns, fabric substrates, and compositions according to this invention can be used to prepare or used in various textiles including those having heat or other radiation blocking properties. For example, the coated yarns can be used to prepare textiles that block heat (near infrared radiation). Alternatively, such textiles can be used as substrate upon which other materials can be disposed for various purposes. Resulting articles can be used as, for example, curtains and other window treatments, carpets, window blinds, room dividers, cubicle curtains, banners, labels, projection screens, clothing, coverings and tarpaulins (for example for vehicles, boats, and other objects), and packaging materials. Articles containing the textiles can optionally have a printable outer surface able to accept ink used in screen printing, gravure printing, inkjet printing, thermal imaging (such as "dye sublimation thermal transfer"), or other imaging processes.

Other potential uses of the coated yarns and fabric substrates according to the present invention include but are not limited to, mattress and pillow ticking, bedspreads, mattress covers, draperies, awnings, upholstery, automotive and airplane seat covering, protective apparel, wallpaper, flooring materials, and field shelter (tents) materials.

Coated Yarns

Coated yarns designed according to the present invention typically comprise a continuous length of yarn forming a yarn core as described above. Particularly useful yarn cores comprise a set of one (mono-) or more (multi-) individual continuous filaments composed of synthetic or naturally-occurring materials, extending essentially in the same direction longitudinally. Multifilament yarn cores comprising two or more individual continuous filaments are useful in many embodiments.

Each coated yarn according to the present invention generally has a mean diameter of at least 25 µm and up to and including 1500 µm or of at least 100 µm and up to and including 1000 µm. The "mean diameter" is the arithmetic mean of multiple diameter measurements taken of the coated yarn, for example ten such measurements, using an MSD 25 diameter measuring device (for example, available from Zumbach). A mono- or multifilament yarn core can have a denier of at least 75 and up to and including 2500 wherein a denier refers to a 1.2 g per 9000 meters of a continuous strand.

For example, the mono- or multifilament yarn core can have a continuous filament count of at least 20 and up to including 1000, or more likely at least 30 and up to and including 500. It is desirable that such continuous filaments be composed of one or more materials that burn poorly and have a melting point greater than the temperature at which polymers coated axially thereon are processed or dried. In some embodiments, each continuous filament can be composed of organic or inorganic materials lacking halogen atoms and are recyclable. The continuous filaments can be of uniform or variable length. Such materials can include but are not limited to, thermoplastic polymers such as polyamides (such as nylon); aramids (aromatic polyamides such as Nomex); polyesters [such as polyethylene terephthalate (PET)]; polyurethanes; polyolefins (such as polypropylenes, polyethylenes, and ethylene-propylene copolymers); vinyl polymers (such as vinyl acetate and acrylic resins); cellulosic polymers (such as cellulose acetate); cotton; and glasses (in the form of fiberglass). In addition, each continuous filament can be a mixture of such polymeric materials; and, it is possible for the core to be composed of filaments composed of different polymeric materials. The fiberglass filaments are particularly useful to form a mono- or multifilament core.

The yarn core according to the present invention comprises at least on an average 15 weight % and up to and including 50 weight %, based on the total dry weight of the coated yarn. The mean diameter of the yarn core is generally at least 20 µm and up to and including 1450 µm or of at least 90 µm and up to and including 950 µm. The "mean diameter" is the arithmetic mean of multiple diameter measurements taken of the yarn core, for example ten such measurements, using an MSD 25 diameter measuring device (for example, available from Zumbach). The various continuous filaments can be designed with a particular composition, mean diameter, and length to provide a desired tensile strength.

Some or all continuous filaments in the mono- or multifilament yarn core can comprise one or more additives including but not limited to filament (or fiber) reinforcing materials, polymer stabilizers, UV absorbers, flame retardants, plasticizers, tinting colorants, opacifying colorants, or other materials that one skilled in the art would readily understand as useful in such materials, for example as described in EP 0 900 294B1 (noted above).

Each mono- or multifilament yarn core can be prepared using known technology, for example as described in U.S. Patent application Publication 2007/0015426 (Ahmed et al.), the disclosure of which is incorporated herein by reference.

According to the present invention, a "coating" is disposed coaxially on (or around the entire circumference) of the yarn core, which coating is described in more detail below. In some embodiments, this coating is disposed coaxially and directly on the yarn core, meaning that there are no intermediate layers, coatings, or disposed materials between the coating containing (i) through (iii) described below, and the yarn core. In addition, the coating can be the outermost coaxial coating in the coated yarn. The coating thus provides a generally circular (or co-axial) shape to the coated yarn and can be present at a coverage of at least 5 g/m² and up to and including 200 g/m².

It is also desirable that the (i) porous particles (described below) are present in the coatings at a coverage of at least 4 g/m², or they comprise at least 2 weight % and up to and including 40 weight %, based on the total coating weight.

However, in other embodiments, there can be at least one intermediate coaxial coating, sheath, or zone disposed between the yarn core and the coating containing the (i) through (iii) components. For example, one or more intermediate coaxial coatings can be composed of the same or different polymers (such as a flame-retarding polymer), and the same or different types of amounts of non-polymeric flame retardants. Such coaxial layer arrangements of intermediate coaxial coatings (or sheaths) are illustrated in FIG. 1 and Columns 4-7 of U.S. Pat. No. 9,920,458 (noted above), the disclosure of which is incorporated herein by reference. It is desirable that the one or more intermediate coaxial coatings be detectably different in some manner (for example, chemical composition, optical properties, or other properties) from the coating containing (i) through (iii) components described below. In such embodiments, the coating described herein containing the (i) through (iii) components is disposed coaxially on the outermost intermediate coaxial coating and is also generally the outermost coaxial coating in the coated yarn. One or more intermediate coaxial coatings can be designed to be present at a coating weight that would be readily apparent to one skilled in the art. Any or all intermediate coaxial coatings can include one or more flame retardants, plasticizers, tinting agents, or other additives that would be readily apparent to one skilled in the art.

In most useful embodiments, the "coating" described herein as disposed on the yarn core can be an "aqueous-based coating" derived from an aqueous composition as described in more detail below.

The coatings disposed on the yarn core according to the present invention comprises three essential components: (i) porous particles, (ii) one or more film-forming binders; and (iii) an inorganic filler material, all of which are described below in more detail. In many embodiments, such coatings "consist essentially of" the noted (i), (ii), and (iii) components as these components are the only one essential to providing the inventive properties described above.

The respective amounts of these essential components are based on the total weight of the coating disposed on the yarn core, including any residual (iv) solvent medium (described below). The (i) porous particles can be present in an amount of at least 4 weight % and up to and including 20 weight %, or at least 7 weight % and up to and including 15 weight %. The (ii) film-forming binder material (or mixtures thereof) can be present in an amount of at least 40 weight % and up to and including 90 weight %, or of at least 50 weight % and up to and including 80 weight %. Moreover, the, (iii) inorganic filler material (or mixtures thereof) can be present in an amount of at least 4 weight % and up to and including 30 weight %, or in an amount of at least 7 weight % and up to and including 20 weight %.

It is also desirable in some embodiments that the weight ratio of the (ii) film-forming binder material to the (i) porous particles in the coating is at least 2:1 to and including 25:1; the weight ratio of the (ii) film-forming binder material to the (iii) inorganic filler material in the coating is at least 1.5:1 to and including 25:1; or the weight ratio of the (i) porous particles to the (iii) inorganic filler material in the coating is at least 0.1:1 to and including 5:1. Two or all three of these weight ratio conditions can be present simultaneously if desired.

(i) Porous Particles:

Each of the (i) porous particles useful in the coating comprises a continuous polymeric phase and discrete pores distributed within the continuous phase and has a mode particle size of at least 2 μm and up to and including 50 μm. The (i) porous particles can be prepared using one or more water-in-oil emulsions in combination with an aqueous suspension process, such as in the Evaporative Limited Coalescence (ELC) process. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the (i) porous particles are generally polymeric and organic in nature (that is, the continuous polymeric phase is polymeric and organic in nature) and non-porous particles (having less than 20 volume % porosity) are generally excluded for use in the present invention. Smaller inorganic particles can be present on the outer surface of the (i) porous particles as noted below. It is desirable that the porous particles contain no opacifying colorants such as carbon black.

The (i) porous particles generally have a porosity of at least 20 volume % and up to and including 70 volume %, or at least 35 volume % and up to and including 65 volume %, or more typically at least 40 volume % and up to and including 60 volume %, all based on the total porous particle volume. Porosity can be measured using the known mercury intrusion technique.

The (i) porous particles can be composed of a continuous polymeric phase derived from one or more organic polymers that are chosen so that the continuous polymeric phase has a glass transition temperature ($T_g$) of at least 25° C., or more typically of at least 25° C. and up to and including 180° C., as determined using Differential Scanning calorimetry.

The continuous polymeric phase can comprise one or more organic polymers having the properties noted above and comprise generally at least 70 weight % and up to and including 100 weight % based on the total weight of the continuous polymeric phase. In some embodiments, the continuous polymeric phase is composed of one or more cellulose polymers (or cellulosic polymers) including but not limited to, those cellulosic polymers derived from one or more of cellulose acetate, cellulose butyrate, cellulose acetate butyrate, and cellulose acetate propionate. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful. Details about such polymers are provided, for example, in U.S. Pat. No. 9,963,569 (Nair et al.), the disclosure of which is incorporated herein by reference In other embodiments, the continuous polymeric phase can comprise one or more organic polymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more a-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Other useful polymers include polyurethanes, urethane acrylic copolymers, epoxy resins, silicone resins, polyamide resins, and polyesters of aromatic or aliphatic polycarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The polyesters can be saturated or unsaturated. Other useful polyesters include lactic acid polymers, glycolic acid polymers, caprolactone polymers, and hydroxybutyric acid polymers. Details of such useful polymers are provided, for example in U.S. Pat. No. 9,891,350 (Lofftus et al.) and U.S. Pat. No. 9,469,738 (Nair et al.), the disclosures of both of which are incorporated herein by reference. Mixtures of one or more of such polymers with one or more of the cellulose polymers described above can also be used.

The continuous polymeric binder of the (i) porous particles can also be derived from ethylenically unsaturated polymerizable monomers and polyfunctional reactive compounds as described for example in U.S. Pat. No. 8,703,834 (Nair et al.), the disclosure of which is incorporated herein by reference.

In general, the (i) porous particles used in the present invention have a mode particle size equal to or less than 50 µm, or of at least 2 µm and up to and including 50 µm, or typically of at least 3 µm and up to and including 30 µm or even up to and including 40 µm. Most useful (i) porous particles have a mode particle size of at least 3 µm and up to and including 20 µm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

Pore stabilizing materials such as hydrocolloids can be present within at least part of the volume of the discrete pores distributed throughout the continuous polymeric phase, which pore stabilizing materials are described in the Nair, Nair et al., and Putnam et al. patents cited above. For example, the pore stabilizing material can be selected from the group consisting of carboxymethyl cellulose (CMC), a gelatin, a protein or protein derivative, polyvinyl alcohol and its derivatives, a hydrophilic synthetic polymer, and a water-soluble microgel.

It can be desirable in some embodiments to provide additional stability of one or more discrete pores in the (i) porous particles during their formation, by having one or more amphiphilic block copolymers disposed at the interface of the one or more discrete pores and the continuous polymeric phase. Such materials are "low HLB", meaning that they have an HLB (hydrophilic-lipophilic balance) value as it is calculated using known science, of 6 or less, or even 5 or less. The details of these amphiphilic polymers and their use in the preparation of the (i) porous particles are provided in U.S. Pat. No. 9,029,431 (Nair et al.), the disclosure of which is incorporated herein by reference. A particularly useful amphiphilic block copolymer useful in such embodiments comprises poly(ethyleneoxide) and poly (caprolactone) that can be represented as PEO-b-PCL. Amphiphilic block copolymers, graft copolymers and random graft copolymers containing similar components are also useful including other polymeric emulsifiers such as GRINDSTED® PGPR 90, polyglycerol polyricinolate emulsifier, obtained from Danisco, Dupont.

The (i) porous particles used in this invention can be spherical or non-spherical depending upon the desired use. In a method used to prepare the (i) porous particles, additives (shape control agents) can be incorporated into the first or second aqueous phases, or in the oil (organic) phase to modify the shape, aspect ratio, or morphology of the (i) porous particles. The shape control agents can be added prior to or after forming the water-in-oil-in-water emulsion. In either case, the interface at the oil and second water phase is modified before organic solvent is removed, resulting in a reduction in sphericity of the porous particles. The (i) porous particles used in the present invention can also comprise surface stabilizing agents, such as colloidal silica, on the outer surface of each porous particle, in an amount of at least 0.1 weight %, based on the total dry weight of the (i) porous particle.

The average size of the discrete pores in the (i) porous particles is described above.

The (i) porous particles can be provided as powders, or as aqueous suspensions (including water or water with water-miscible organic solvents such as alcohols). Such powders and aqueous suspensions can also include surfactants or suspending agents to keep the (i) porous particles suspended or to facilitate rewetting them in an aqueous medium.

In a dry coating disposed on the mono- or multifilament core, the large mismatch in refractive index between the discrete pores of the (i) porous particles and the polymer walls (continuous polymeric phase), causes incident electromagnetic radiation passing through the aqueous-based coating to be scattered by the multiplicity of interfaces and discrete pores. The back scattered electromagnetic radiation can again be scattered and returned in the direction of the incident electromagnetic radiation thus reducing the attenuation and contributing to the opacifying power and lightness or luminous reflectance of the aqueous-based coating.

(ii) Film-Forming Binder Materials:

The one or more (ii) film-forming binder materials present in the coatings are designed so that they have the following properties: they are generally water-soluble or water-dispersible; they are capable of being disposed onto a suitable yarn core as described below; they are capable of being dried and where desired also crosslinked (or at least partially cured); they have good light and heat stability; and they are film-forming but contribute to the flexibility of the coated yarn and are thus not too brittle, for example having a $T_g$ of less than 25° C., a $T_g$ of less than or equal to 0° C., a $T_g$ of less than or equal to −10° C., or less than or equal to −25° C., all as determined using Differential Scanning calorimetry.

The (ii) film-forming binder materials can include one or more organic polymers that are film forming and that can be provided as an emulsion, dispersion, or in an aqueous solution. They can also include polymers that are self-crosslinking, or it can include one or more polymers that are self-crosslinking or self-curable, or they can include one or more polymers to which crosslinking agents are added and are thus curable or capable of being at least partially crosslinked or cured under appropriate conditions.

Thus, if a (ii) film-forming binder material is crosslinkable (or curable) in the presence of a suitable crosslinking agent or catalyst, such crosslinking (or curing) can be activated chemically with heat, radiation, or other known means. A curing or crosslinking process serves to provide improved insolubility of the resulting coated layer as well as cohesive strength and adhesion to the coated yarn core. The curing or crosslinking agent is generally a chemical having functional groups capable of reacting with reactive sites in a (ii) film-forming binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful (ii) film-forming binder materials include but are not limited, to water-soluble or water-dispersible polymers of the following types: poly(vinyl alcohol), poly(vinyl pyrrolidone), ethylene oxide polymers, polyurethanes, urethane-acrylic copolymers, other acrylic polymers, styrene-acrylic copolymers, vinyl polymers, vinyl acrylic copolymers, styrene-butadiene copolymers, acrylonitrile copolymers, and polyesters, silicone polymers or a combination of two or more of these organic polymers. Such (ii) film-forming binder materials, such as acrylic polymers, are readily available from various commercial sources or can be prepared using known starting materials and synthetic conditions. A useful class of (ii) film-forming binder materials includes aqueous latex polymer dispersions such as acrylic latexes that can be ionic or nonionic colloidal dispersions of acrylate polymers and copolymers. Useful film-forming aqueous latexes include styrene-butadiene latexes, poly(vinyl chloride) and poly(vinylidene chloride) latexes, poly(vinyl pyridine) latexes, poly(acrylonitrile) latexes, and latexes formed from acrylonitrile, butyl acrylate, and ethyl acrylate. A useful mixture of (ii) film-forming binder materials includes but is not limited to, a mixture of poly(vinyl chloride) and a non-halogenated acrylic polymer, in suitable weight ratios, or copolymers derived from vinyl chloride and one or more non-halogenated acrylic monomers.

(iii) Inorganic Fillers Materials:

Useful (iii) inorganic filler materials in the coating according to this invention are desirably those that can impart lightness (or brightness) and opacity to the coating and have a MOHS scale of mineral hardness value of less than 5 and generally at least 1 and up to and including 5, or even at least 2 and up to and including 4.5. Such hardness values ensure that inorganic fillers are minimally abrasive to the yarn cores such as for example multifilament fiberglass yarn cores and do not abrade the die used in manufacturing for depositing the coating as a sheath around the yarn core. Thus, such inorganic filler materials can also be considered "non-abrasive, whitening inorganic filler materials."

Examples of useful inorganic filler materials include but are not limited to, zinc sulfide, barium sulfate, calcium carbonate, mica, fluorite, clay, and gypsum. Mixtures of different organic filler materials can be used if desired, such as a mixture of zinc sulfide (MOHS value of 3.8) and barium sulfate (MOHS value of 3-3.5), in suitable weight ratios. The MOHS scale of hardness is known as a quantitative measure of scratch resistance and the relative hardness of one material compared to another. This value can be determined by, for example, by using a sclerometer, or by using comparisons with materials of known MOHS values. The MOHS scale of hardness value for some useful materials is known in the literature.

Optional Materials:

While the (i) porous particles, (ii) film-forming binder materials, and (iii) inorganic fillers described above are the only essential materials used in the coating necessary to achieve the inventive properties described above, some optional materials may be included as long as they do not materially interfere with those inventive properties. Such optional materials can be present in a total amount of less than 30 weight %, based on the total weight of the coating. Such optional materials can include but are not limited to, thickening agents, flame retardants, UV radiation stabilizers, heat stabilizers, tinting agents, dispersants, biocides, lubricants, and moisture or deflection control agents, individually or in any combination.

These optional materials can be incorporated into the coating in any suitable location that is technically practical, such as within the (i) porous particles (either within discrete pores, the continuous polymeric phase, or in both the discrete pores and continuous polymeric phase); within the (ii) film-forming binder materials; or with both (i) porous particles and (ii) film-forming binder materials. Various optional materials can be in different locations in the coating.

Useful thickening agents can be present to modify the viscosity of the composition (coating formulation) before it is applied to the mono- or multifilament core yarn. Particularly useful rheology modifiers are RHEOLATE® HX 6010 (Elementis), OPTIFLO®-T 1000 (BYK), RHEOVIS® PU 1214 (BASF), ACRYSOL® G111 (Dow Chemical Company), and PARAGUM products (Royal Adhesives, Inc.).

Useful flame retardants can be present to reduce the flammability of the yarn strands and can include but are not limited to, phosphorus- or nitrogen-containing flame retardants such as ammonium polyphosphates; melamine isocyanurate; derivatives or pentaerythritol and a melamine; and ammonium molybdates. More specific examples of useful compounds are provided in [0036]-[0043] of U.S. Patent application Publication 2013/0052900 (Jung et al.), the disclosure of which is incorporated herein by reference.

Tinting agents can be present to provide a specific observable color, coloration, or hue in the resulting continuous yarn strand and substrates. Mixtures of tinting colorants can be present, and they can be different in composition and amounts. The desired coloration or hue can be obtained using specific tinting colorants can be used in combination with specific amounts of (i) porous particles to offset or modify the original color of a continuous yarn strand to provide more whiteness (or brightness) in the final "color" (or coloration). The one or more tinting colorants can be incorporated within the (i) porous particles (either within the volume of discrete pores, within the continuous polymeric phase, or in both places) or they can be uniformly dispersed within the (ii) film-forming binder material. Alternatively, one or more tinting colorants can be present within both the (i) porous particles (in a suitable location) and within the (ii) film-forming binder material. The one or more tinting colorants can be present in an amount of at least 0.0001 weight %, or more typically at least 0.001 weight %, and up to and including 3 weight %, based on the total weight of the coating. Tinting colorants can be dyes or organic pigments that are soluble or dispersible in organic solvents and polymers that are used for making the (i) porous particles and thus can be included within the oil phase used to prepare such (i) porous particles. Alternatively, the tinting colorants can be primarily water-soluble or water-dispersible materials that are included into an aqueous phase used to prepare the (i) porous particles.

Dispersants can be present in the water-based coating to provide colloidal stability and prevent agglomeration of the solid particles thereby ensuring storage stability (no viscosity instability, no separation) in the aqueous formulation Examples of useful dispersants include but are not limited to, TERGITOL® ethoxylated alcohols and water-dispersible and water-soluble SOLSPERSE® 43000 polymeric dispersants.

Biocides (that is, antimicrobial agents or antifungal agents) can be present to reduce or prevent growth of microorganisms and fungi in the continuous yarn strands and substrate prepared therefrom. Such materials can include but are not limited to, silver metal (for example, silver particles, platelets, or fibrous strands) and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates and copper salts can be present as (c) additives for biocidal purposes. Mixtures of any of silver metal, silver-containing compounds, copper metal, and copper-containing compounds, can also be present and used in this manner.

After application and drying, the coating generally has very little (iv) aqueous medium (such as water) left from the original composition (or "coating formulation"). That is, the residual amount of (iv) aqueous medium can be as little as 5 weight % or less, or even 1 weight % or less, based on the total weight of the coating.

Aqueous Compositions (or Coating Formulations):

The coating used according to the present invention is provided by application to the yarn core (such as a mono- or multifilament core) of an aqueous composition that comprises (or consists essentially of) the (i) porous particles described above, (ii) a film-forming binder material as described above, (iii) an inorganic filler material as described above, and (iv) an aqueous medium.

In general, the (iv) aqueous medium is designed so that the (ii) film-forming polymers described above are soluble or dispersible therein. Thus, it is highly desirable that the (iv) aqueous medium have predominantly water as the solvent. For example, the (iv) aqueous medium can comprise water in an amount of at least 80 weight %, at least 95 weight %, or even 100 weight %, based on the total solvents therein. The (iv) aqueous medium can contain very low amounts of auxiliary solvents other than water, and if they are present, they are generally water-miscible in nature and include but are not limited to alcohols and acetone. Such auxiliary solvents do not adversely affect formulation or use of the aqueous-based composition.

The (iv) aqueous medium can comprise at least 35 weight % and up to and including 70 weight %, or typically at least 40 weight % and up to and including 60 weight %, of the total weight of the composition (or coating formulation).

The solids content in the aqueous compositions according to the present invention is generally at least 30% and up to and including 65%, or at least 35% and up to and including 55%.

The amounts of the essential components (i) porous particles, (ii) film-forming binder materials, and (iii) inorganic filler materials, are as follows, all amounts being based on the total weight of the aqueous composition:

The (i) porous particles are generally present in the aqueous compositions in an amount of at least 2 weight % and up to and including 10 weight %, or typically at least 4 weight % and up to and including 8 weight %, based on the total weight of the composition [including (iv) solvent medium], particularly when the (a) porous particles have a mode size of at least 3 µm and up to and including 30 µm.

The one or more (ii) film-forming binder materials can be present in an amount of at least 25 weight % and up to and including 60 weight %, or typically at least 30 weight % and up to and including 50 weight %.

The (iii) inorganic filler material (or mixture thereof) such as non-abrasive, whitening inorganic filler materials, can be present in an amount of at least 2 weight % and up to and including 15 weight %.

The aqueous compositions according to the present invention to form the coating on the mono- or multifilament core generally has a viscosity of at least 5 centipoise (0.005 Pa-sec) and up to and including 5000 centipoise (5 Pa-sec) as measured at a shear rate of 10K $sec^{-1}$ and 25° C. using known procedures and equipment.

The compositions according to the present invention can be prepared by mixing the components using suitable mixers such as an overhead stirrer attached with a Cowles blade, impeller or turbine blade in order to break up agglomerated particles and create a stable suspension of fine solids.

Fabric Substrates

Continuous yarns can be prepared using suitable extrusion techniques known in the art. In the practice of the present invention, the coated yarn is readily prepared by passing the yarn core (such as a mono- or multifilament core) through a bath comprising the aqueous coating composition and then through a heat treatment that serves to remove the water and any other solvents, and to cure or set the film-forming binder material. Application of the aqueous composition can be achieved by conventional immersion, contact or spray methods using rollers, pads, apron applicators, sprays, or jets, or a combination thereof. A particularly useful method to form the coating in a coaxial manner includes withdrawing the yarn core from a supply bobbin and passing it through a receptacle wherein it is immersed in the aqueous composition according to the present invention; then passing the coated yard core through a die that serves to remove excess aqueous composition; followed by treating the coated yard core in an oven maintained at a temperature adequate to dry the aqueous composition and to cure the film-forming binder material; and then the resulting coated yarn is wound onto a take up reel.

The fabric substrates according to the present invention can be prepared by appropriate weaving or other manufacturing process using a plurality of coated yarns according to this invention. For example, the coated yarn can be subjected to warping, weaving, Centering, and packaging operations to obtain a fabric substrate and formed into a fabric substrate of any size or shape. Alternatively, the coated yarn can be woven, interlocked, spun, knitted, or adhesively-bonded using techniques known in the art. The coated yarn strands can vary in dry thickness and length as long as they are suitable for the fabric substrate and its intended purpose. In most embodiments, the fabric substrate thickness is at least 50 µm. The coated yarn should have suitable hardness, tensile strength, lot moisture content (for example, less than 1 weight % at 70% relative humidity), elongation, and light fastness. Details about such processes are provided in [0072] through [0076] of U.S. Patent application Publication 2013/0052900 (Jung et al.), the disclosure of which is incorporated herein by reference.

The fabric substrates prepared according to the present invention generally have an openness (or Openness Factor) of 0% and up to and including 15%, or at least 1% and up to and including 10%, or more likely at least 3% and up to and including 10%.

As noted above, the fabric substrates can be used in many ways, and they can be used "as is" or they can be subjected to further operations to incorporate them into various articles and devices. For example, the fabric substrates can be coated with other materials for various purposes, and they can be laminated to films, papers, or other elements.

It is further possible to print images on an outer surface of a fabric substrate using any suitable printing means such as inkjet printing or flexographic printing, thereby forming printed images of text, pictures, symbols, or combinations thereof. Such printed images can be visible, or they can invisible to the unaided eye (for example, using fluorescent dyes in the printed images). Alternatively, an outer surface can be covered by suitable means with a colorless layer to provide a desired protective finish.

A thermally printed image can be formed on either outer surface, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches with or without a thermal colorless (clear) patch. Useful details of such a process to make thermally printed images are provided in copending and commonly assigned U.S. Ser. No. 15/590,342 (filed May 9, 2017 by Nair and Herrick), the disclosure of which is incorporated herein by reference.

The present invention provides at least the following embodiments and combinations thereof, but other combinations of features are considered to be within the present invention as a skilled artisan would appreciate from the teaching of this disclosure:

1. A fabric substrate comprising a plurality of coated yarns, all woven together, wherein each coated yarn comprises a yarn core; and a coating disposed coaxially on the yarn core, which coating comprises:

(i) porous particles present in an amount of at least 4 weight % and up to and including 20 weight %, each porous particle comprising a continuous polymeric phase and discrete pores dispersed within the continuous polymeric phase, the porous particles having a mode particle size of at least 2 µm and up to and including 50 µm;

(ii) a film-forming binder material having a $T_g$ of less than or equal to 25° C., which film-forming binder material is present in an amount of at least 40 weight % and up to and including 90 weight %; and (iii) an inorganic filler material having a value of less than 5 on the MOHS scale of mineral hardness, the inorganic filler material being present in an amount of at least 4 weight % and up to and including 30 weight %, wherein the amounts of the (i) porous particles, the (ii) film-forming binder material, and the (iii) inorganic filler material are based on the total weight of the coating.

2. The fabric substrate of embodiment 1, having an L* of at least 70 and a CIE Y tristimulus value of at least 65.

3. The fabric substrate of embodiment 1 or 2, wherein the yarn core is a mono- or multifilament core that is composed of multiple glass or polyester filaments.

4. The fabric substrate of any of embodiments 1 to 3, wherein the coating consists essentially of the (i) porous particles, the (ii) film-forming binder material, and the (iii) inorganic filler material.

5. The fabric substrate of any of embodiments 1 to 4, wherein the coating is disposed coaxially and directly on the yarn core.

6. The fabric substrate of any of embodiments 1 to 5, wherein each coated yarn comprises at least one intermediate coating disposed coaxially between the yarn core and the coating.

7. The fabric substrate of embodiment 6, wherein the at least one intermediate coating comprises at least one flame-retarding polymer.

8. The fabric substrate of any of embodiments 1 to 7, wherein the coating is disposed coaxially and directly on the yarn core, and each coated yarn further comprises an outer coating disposed coaxially on the coating.

9. The fabric substrate of embodiment 8, wherein the outer coating comprises at least one flame-retarding polymer.

10. The fabric substrate of any of embodiments 1 to 9, wherein the weight ratio of the (ii) film-forming binder material to the (i) porous particles in the coating is at least 2:1 to and including 25:1.

11. The fabric substrate of any of embodiments 1 to 10, wherein the weight ratio of the (ii) film-forming binder material to the (iii) inorganic filler material in the coating is at least 1.5:1 to and including 25:1.

12. The fabric substrate of any of embodiments 1 to 11, wherein the weight ratio of the (i) porous particles to the (iii) inorganic filler material in the coating is at least 0.1:1 to and including 5:1.

13. The fabric substrate of any of embodiments 1 to 12, wherein the (i) porous particles are present in the coating at a coverage of at least 4 g/m².

14. The fabric substrate of any of embodiments 1 to 13, wherein the (iii) inorganic filler material comprises barium sulfate, calcium carbonate, mica, fluorite, clay, gypsum, or zinc sulfide.

15. The fabric substrate of any of embodiments 1 to 14, wherein the (iii) inorganic filler material is a non-abrasive, whitening inorganic filler material that comprises zinc sulfide.

16. The fabric substrate of any of embodiments 1 to 15, wherein the (i) porous particles have a mode particle size of at least 3 µm and up to and including 30 µm, a porosity of at least 35 volume % and up to and including 65 volume %, and have a continuous polymeric phase composed of one or more of a polyester, a vinyl copolymer, and a cellulosic polymer such as cellulose acetate, cellulose butyrate, cellulose acetate butyrate, and cellulose acetate propionate.

17. The fabric substrate of any of embodiments 1 to 16, wherein the (ii) film-forming binder material comprises one or more acrylic polymers.

18. The fabric substrate of any of embodiments 1 to 17, wherein the (ii) film-forming binder material comprises a copolymer derived from vinyl chloride and one or more non-halogenated acrylic monomers.

19. The fabric substrate of any of embodiments 1, wherein the coating further comprises one or more of the following optional materials that are different from all of (i), (ii), and (iii): thickening agent, flame retardant, UV radiation stabilizer, tinting agent, dispersant, biocide, heat stabilizer, lubricant, and moisture or deflection control agent.

20. The fabric substrate of any of embodiments 1 to 19, wherein the multifilament core is composed of multiple glass filaments.

21. The fabric substrate of any of embodiments 1 to 20, wherein the (i) porous particles contain no carbon black.

The following Examples are provided to illustrate the practice of this invention and are not meant to be limiting in any manner. The following materials were used in the Examples.

Materials Used in the Following Examples

The continuous polymeric phase polymers used in the following examples were the Eastman™ Cellulose Acetate Butyrate 381-0.5 (CAB), a cellulose ester, $T_g$ of 130° C. (obtained from Chem Point).

NALCO® 1060 containing colloidal silica was obtained from Nalco Chemical Company as a 50 weight % aqueous dispersion.

The poly(methylamino ethanol adipate) (AMAE) co-stabilizer was prepared using known procedures and starting materials.

Carboxy methylcellulose (CMC, 250,000 kDa) was obtained from Acros Organics or from Ashland Aqualon as Aqualon 9M31F. These products were used interchangeably.

The amphiphilic block copolymer of polyethylene oxide and polycaprolactone (PEO-b-PCL) 5K-20K, was prepared using the procedure described in U.S. Pat. No. 5,429,826 (Nair et al.) where the first number is the molecular weight of the hydrophilic block segment, PEO, and the second number is the molecular weight of the oleophilic block segment, PCL.

TERGITOL® 15-S-7, a C12-C14 secondary alcohol surfactant having an HLB value of 12.4, was obtained from the Dow Chemical Corp.

The optical brightener TINOPAL® OB CO was obtained from BASF Corporation.

VYCAR® 460×46 a PVC-acrylic copolymer emulsion, used as the binder polymer was obtained from Lubrizol Corp.

TERGITOL® NP-30 surfactant, a nonylphenol ethoxylate surfactant, was obtained from the Dow Chemical Corp.

SACHTOLITH HD-S Zinc Sulfide was obtained from Venator Corp.

Campine HT antimony trioxide was obtained from Campine Corp.

RHEOLATE® HX 6010 thickener was obtained from Elementis Corp.

Coatings to determine opacity were made on a Leneta card form 2C-opacity (possessing both black and white regions) obtained from Leneta Company.

Yarn 1 was SULKY® 40 wt 100% viscose/rayon multifilament fiber thread having a thickness of 0.33 mm.

Yarn 2 was a transparent monofilament fishing line with a thickness of 0.37 mm.

Preparation of Porous Particles

The (i) porous particles (P) used in the Invention Example contained cellulose acetate butyrate without any opacifying pigment were prepared as described in U.S. Pat. No. 9,963, 569 (noted above). The resulting (i) porous particles had a particle size of 5.5 µm and a porosity of 52.2%.

Measurements

The mode particle size of the (i) porous particles used in the Examples was measured using a Sysmex FPIA-3000 automated particle size analyzer from Malvern Instruments. The particle size of the dispersed pigments was determined using light scattering.

The porosity of the (i) porous particles was measured using a modified version of the known mercury intrusion porosimetry method.

The opacity of each formulation coated on the Leneta card was determined by first measuring the Y tristimulus values (in the 400-700 nm wavelength range) of the dry coatings over both the black and white regions of the card using a Hunter Labs UltraScan XE colorimeter. The colorimeter was equipped with an integrating sphere, a pulsed Xenon light source, and appropriate filters to simulate standard D65 illumination. The following equation was used to calculate a numerical value for the opacity of each aqueous formulation:

$$\text{Opacity (\%)} = \frac{Y_{black}}{Y_{white}} \times 100$$

In order to measure the lightness of coatings on Yarn 1 and Yarn 2, and the opacity of the coating on Yarn 2, each sample was wound on small squares of black or white corrugated cardboard. The spectral reflectance and CIE Tristimulus values of each wound sample were then measured in the 400-700 nm wavelength range using an X-Rite SP-60 portable spectrophotometer equipped with an integrating sphere, a Tungsten light source, and appropriate filters to stimulate D65 illumination. A light trap and standard white tile were used to fix the percent reflectance range from 0 to 100%. The measured X, Y, and Z tristimulus values were used to calculate specific values for the lightness (L*), red-green character (a*), and yellow-blue character (b*) and opacity of each coated and uncoated, wound yarn sample. The CIE Y tristimulus value was used as a measure of the luminous reflectance or lightness of each sample.

Comparative Example 1

An aqueous composition was prepared by combining 42.1 weight % of VYCAR® 460×46 as a (ii) film-forming binder material, 0.05 weight % of TERGITOL® NP-30 surfactant, 7.0 weight % SACHTOLITH HD-S zinc sulfide as a (iii) non-abrasive, whitening inorganic filler material, 0.6 weight % Campine HT antimony trioxide, and water in a container. The resulting formulation was mixed using a Cowles blade until all particles were well dispersed, then thickened by adding 1 weight % RHEOLATE® HX 6010 thickener. The resulting aqueous composition was coated using a blade with a 0.005 inch (0.13 mm) gap onto Substrate 1 (described above), dried at 120° C., and followed by curing at 160° C. to form a dry layer on a Leneta card for obtaining opacity measurements.

Comparative Example 2

Comparative Example 2 was prepared in the same manner as the Comparative Example 1, except 5 weight % of (i) porous particles P were used in place of the zinc sulfide in the aqueous formulation.

Comparative Example 3

Comparative Example 3 was prepared in the same manner as the Comparative Example 1 except no zinc sulfide or (i) porous particles (P) were present in the aqueous formulation.

Invention Example 1

Invention Example 1 was prepared in the same manner as the Comparative Example 1 except 5.2 weight % of (i) porous particles P were used in place of an equivalent amount of the VYCAR® 460×46 film-forming binder material.

Comparative Example 4

An aqueous formulation was prepared as in Comparative Example 1 and placed in a trough where a sample of Yarn 1 (described above) was immersed, passed through a 0.7 mm die orifice, dried, and cured at 160° C. to form a coated yarn having the dried coating disposed coaxially on the multifilament core, which resulting coated yarn was measured for lightness and luminous reflectance as described above.

Comparative Example 5

An aqueous formulation was prepared as in Comparative Example 1 and placed in a trough where a sample of Yarn 2 (described above) was immersed, passed through a 0.7 mm die orifice, dried, and cured at 160° C. to form a coated yarn having the dried coating disposed coaxially on the multifilament core, which resulting coated yarn was measured for lightness and luminous reflectance as described above.

Invention Example 2

The coated Yarn 1 of Invention Example 2 was prepared in the same manner as the Comparative Example 4 except 5.2 weight % of (i) porous particles P were used in place of an equivalent amount of the VYCAR® 460×46 film-forming binder material.

Invention Example 3

The coated Yarn 2 of Invention Example 3 was prepared in the same manner as the Invention Example 2 except a different yarn was used.

The resulting obtained opacity and colorimetry data for the prepared articles and yarns and coated yarns are shown in the following TABLES I, II, and III.

TABLE I

| Coated on Leneta Card | Opacity |
|---|---|
| Comparative Example 1 | 65.49 |
| Comparative Example 2 | 7.83 |
| Comparative Example 3 | 6.38 |
| Invention Example 1 | 72.51 |

The data in TABLE I indicate that the aqueous composition according to the present invention containing zinc sulfide as a (iii) non-abrasive, whitening inorganic filler material and (i) porous particles, coated on a Leneta card for testing opacity of the resulting coatings, Invention Example 1, exhibited higher opacity compared to those coatings prepared in the Comparative Examples 1-3 using zinc sulfide alone as a (iii) inorganic filler material, (i) porous particles P alone, or with both zinc sulfide and (i) porous particles P absent, in concentrations comparable to the aqueous composition.

TABLE II

| Yarn 1 wound over black | L* | a* | b* | Y |
|---|---|---|---|---|
| Uncoated | 78.22 | −2.77 | −4.99 | 53.59 |
| Comparative Example 4 | 85.24 | −2.84 | 0.38 | 66.48 |
| Invention Example 2 | 88.88 | −1.98 | −4.21 | 73.90 |

The data in TABLE II indicate that coated yarns can be prepared by coating an aqueous composition according to the present invention containing zinc sulfide as a (iii) inorganic filler material and (i) porous particles on a multifilament core, and the resulting coated yarns exhibited higher L* values compared to the uncoated multifilament core (yarn) and the coated yarns prepared in the Comparative Examples 4. The coated yarn prepared according to the present invention also exhibited a significantly higher degree of lightness as indicated by the Y tristimulus value of luminous reflectance.

TABLE III

| Yarn 2 | Opacity | L* wound over black | a* wound over black | b* wound over black | Y wound over black |
|---|---|---|---|---|---|
| Uncoated | 19.01 | 45.99 | −0.40 | −0.41 | 15.26 |
| Comparative Example 5 | 79.41 | 85.23 | −1.34 | 0.24 | 66.46 |
| Invention Example 3 | 88.49 | 90.31 | −0.50 | −2.59 | 76.98 |

The data in TABLE III similarly indicate that additionally, the transparent Yarn 2 coated with an aqueous composition containing zinc sulfide as a (iii) inorganic filler material and (i) porous particles Invention Example 3, according to the present invention, was made opaque. The resulting coated yarn exhibited higher opacity compared to those prepared in the Comparative Example 5 using zinc sulfide alone. The inventive coated yarn exhibited L* and luminous reflectance values that were greater compared to the uncoated multifilament core and the coated yarns prepared in the Comparative Example 5.

The invention has been described in detail with particular reference to certain preferred embodiments thereof, but it will be understood that variations and modifications can be obtained within the spirit and scope of the invention.

The invention claimed is:

1. A fabric substrate comprising a plurality of coated yarns, all woven together, wherein each coated yarn comprises a yarn core; and a coating disposed coaxially on the yarn core, which coating comprises:
   (i) porous particles present in an amount of at least 4 weight % and up to and including 20 weight %, each porous particle comprising a continuous polymeric phase and discrete pores dispersed within the continuous polymeric phase, the porous particles having a mode particle size of at least 2 μm and up to and including 50 μm;

(ii) a film-forming binder material having a $T_g$ of less than or equal to 25° C., which film-forming binder material is present in an amount of at least 40 weight % and up to and including 90 weight %; and (iii) an inorganic filler material having a value of less than 5 on the MOHS scale of mineral hardness, the inorganic filler material being present in an amount of at least 4 weight % and up to and including 30 weight %, wherein the amounts of the (i) porous particles, the (ii) film-forming binder material, and the (iii) inorganic filler material are based on the total weight of the coating.

2. The fabric substrate of claim 1, having an L* of at least 70 and a CIE Y tristimulus value of at least 65.

3. The fabric substrate of claim 1, wherein the yarn core is a mono- or multifilament core that is composed of multiple glass or polyester filaments.

4. The fabric substrate of claim 1, wherein the coating consists essentially of the (i) porous particles, the (ii) film-forming binder material, and the (iii) inorganic filler material.

5. The fabric substrate of claim 1, wherein the coating is disposed coaxially and directly on the yarn core.

6. The fabric substrate of claim 1, wherein each coated yarn comprises at least one intermediate coating disposed coaxially between the yarn core and the coating.

7. The fabric substrate of claim 6, wherein the at least one intermediate coating comprises at least one flame-retarding polymer.

8. The fabric substrate of claim 1, wherein the coating is disposed coaxially and directly on the yarn core, and each coated yarn further comprises an outer coating disposed coaxially on the coating.

9. The fabric substrate of claim 8, wherein the outer coating comprises at least one flame-retarding polymer.

10. The fabric substrate of claim 1, wherein the weight ratio of the (ii) film-forming binder material to the (i) porous particles in the coating is at least 2:1 to and including 25:1.

11. The fabric substrate of claim 1, wherein the weight ratio of the (ii) film-forming binder material to the (iii) inorganic filler material in the coating is at least 1.5:1 to and including 25:1.

12. The fabric substrate of claim 1, wherein the weight ratio of the (i) porous particles to the (iii) inorganic filler material in the coating is at least 0.1:1 to and including 5:1.

13. The fabric substrate of claim 1, wherein the (i) porous particles are present in the coating at a coverage of at least 4 g/m².

14. The fabric substrate of claim 1, wherein the (iii) inorganic filler material comprises barium sulfate, calcium carbonate, mica, fluorite, clay, gypsum, or zinc sulfide.

15. The fabric substrate of claim 1, wherein the (iii) inorganic filler material is a non-abrasive, whitening inorganic filler material that comprises zinc sulfide.

16. The fabric substrate of claim 1, wherein the (i) porous particles have a mode particle size of at least 3 μm and up to and including 30 μm, a porosity of at least 35 volume % and up to and including 65 volume %, and have a continuous polymeric phase composed of one or more of a polyester, a vinyl copolymer, and a cellulosic polymer such as cellulose acetate, cellulose butyrate, cellulose acetate butyrate, and cellulose acetate propionate.

17. The fabric substrate of claim 1, wherein the (ii) film-forming binder material comprises one or more acrylic polymers.

18. The fabric substrate of claim 1, wherein the coating further comprises one or more of the following optional materials that are different from all of (i), (ii), and (iii): thickening agent, flame retardant, UV radiation stabilizer, tinting agent, dispersant, biocide, heat stabilizer, lubricant, and moisture or deflection control agent.

19. A fabric substrate comprising a plurality of continuous coated yarns, all woven together, wherein each continuous coated yarn comprises a multifilament polyester or glass core; and an aqueous-based coating disposed coaxially on the multifilament polyester or glass core, which aqueous-based coating comprises:

(i) porous particles present in an amount of at least 4 weight % and up to and including 20 weight %, each porous particle comprising a continuous polymeric phase and discrete pores dispersed within the continuous polymeric phase, the porous particles having a mode particle size of at least 3 μm and up to and including 30 μm;

(ii) a film-forming binder material having a $T_g$ of less than or equal to 0° C., which film-forming binder material is present in an amount of at least 40 weight % and up to and including 90 weight %; and (iii) a non-abrasive, whitening inorganic filler material having a value of less than 5 on the MOHS scale of mineral hardness, which non-abrasive, whitening inorganic filler material comprises zinc sulfide and is present in an amount of at least 4 weight % and up to and including 30 weight %, wherein the amounts of the (i) porous particles, the (ii) film-forming binder material, the (iii) non-abrasive, and whitening inorganic filler material are based on the total weight of the aqueous-based coating, the fabric substrate has a L* of at least 70 and a Y tristimulus value of at least 65, and the (i) porous particles are present in the coating at a coverage of at least 4 g/m².

20. The fabric substrate of claim 19, wherein the (i) porous particles contain no carbon black.

* * * * *